United States Patent [19]
Hamada

[11] Patent Number: 4,991,909
[45] Date of Patent: Feb. 12, 1991

[54] WHEEL COVER

[75] Inventor: Kazutaka Hamada, Atsugi, Japan

[73] Assignee: Nissan Motor Co., Ltd., Japan

[21] Appl. No.: 339,849

[22] Filed: Apr. 18, 1989

[30] Foreign Application Priority Data

Apr. 27, 1988 [JP] Japan .................................. 63-56890

[51] Int. Cl.$^5$ ............................................. B60B 7/02
[52] U.S. Cl. ............................... 301/37 P; 301/37 PB
[58] Field of Search ............ 301/37 R, 37 P, 37 CM, 301/37 TP, 37 PB, 108 R, 108 A

[56] References Cited

U.S. PATENT DOCUMENTS

| | | | |
|---|---|---|---|
| 2,937,902 | 5/1960 | Barnes et al. | 301/37 TC |
| 4,027,919 | 6/1977 | Foster et al. | 301/37 P X |
| 4,149,754 | 4/1979 | Beisch et al. | 301/37 R |
| 4,457,559 | 7/1984 | Renz | 301/37 P |
| 4,826,253 | 5/1989 | Shirai et al. | 301/37 PB |

FOREIGN PATENT DOCUMENTS

| | | | |
|---|---|---|---|
| 2826121 | 3/1979 | Fed. Rep. of Germany | 301/37 R |
| 3016619 | 11/1981 | Fed. Rep. of Germany | |
| 2311665 | 12/1976 | France | |
| 0279101 | 12/1987 | Japan | 301/37 P |

Primary Examiner—Russell D. Stormer
Attorney, Agent, or Firm—Pennie & Edmonds

[57] ABSTRACT

Disclosed herein is a plastic wheel cover for a road wheel. The wheel cover comprises a cover proper; a series of lugs integrally formed on an inboard face of the cover proper, each lug having a latching pawl which is to be latchingly engageable with an annular ridge formed on a wheel disc of a road wheel; a resilient wire ring held by the lugs and biasing the same radially outwardly; and a series of stoppers integrally formed on the inboard face of the cover proper, the stoppers being arranged to alternate with the lugs. Each of the stoppers comprises at least one radially extending wall which has an upper surface sloped. The height of the wall is gradually reduced as the distance from an inboard end of the wall increases.

11 Claims, 6 Drawing Sheets

WHEEL COVER

BACKGROUND OF THE INVENTION

1. Field of the Invention

The present invention relates in general to a wheel cover detachably attached to a road wheel, and more particularly, to a plastic wheel cover designed to be detachably retained on a monolithic wheel disc, such as aluminium wheel dics and the like. More specifically, the present invention is concerned with a retaining arrangement which is designed to facilitate the retaining of the wheel cover to the wheel disc.

2. Description of the Prior Art

In order to clarify the task of the present invention, one of conventional plastic wheel covers will be outlined with reference to FIGS. 9 and 10 of the accompanying drawings, which is disclosed in Japanese Utility Model First Provisional Publication No. 60-148101.

Referring to the drawings, there is shown a conventional plastic wheel cover 3 which is designed to be detachably retained on an aluminium wheel disc 1. The wheel disc 1 is formed with a concentric circular recess (no numeral) which faces outward. A concentric annular ridge 2 is integrally formed on a side wall of the circular recess, which is raised radially inwardly as shown. Designated by numeral 2a is a top of the annular ridge 2, and 2b is an outside surface of the annular ridge 2.

The plastic wheel cover 3 has a series of lugs 4 molded integrally therewith on the inboard face of the cover 3. The lugs 4 are spaced equally around the circumference of the cover 3 and have respective latching pawls (no numerals) at the leading ends. Each lug 4 has a reinforcing rib (no numeral) integrated therewith. The wheel cover 3 has further a series of stoppers 5 integrated therewith. The stoppers 5 are arranged to alternate with the lugs 4. The lugs 4 are biased radially outwardly by a resilient wire ring 6 which is held by the lugs 4.

Upon requirement of retaining the wheel cover 3 to the wheel disc 1, the wheel cover 3 is brought to a proper temporary position as is shown in FIG. 9 wherein some of the latching pawls of the lugs 4 contact with the top 2a of the annular ridge 2 and some of the stoppers 5, which are arranged at diametrically opposite positions of the lugs 4, contact with the outside surface 2b of the ridge 2. Then, the wheel cover 3 is forced flatwise against the outer face of the wheel disc 1. Usually, the wheel cover 3 is strongly pushed or struck with a heel of an operator's hand. With this, the latching pawls 4 of all lugs 4 are brought into a latching engagement with the annular ridge 2 in a snap action manner against the force of the wire spring 6. Excessive insertion of the wheel cover 3 to the wheel disc 1 is suppressed by the stoppers 5 which are now in contact with the outside surface 2b of the annular ridge 2.

However, due to its inherent construction, the above-mentioned conventional wheel cover 3 has the following drawback.

That is, as is shown in FIG. 10, upon bringing the wheel cover 3 to the temporary position, it sometimes happens that some of the stoppers 5 are deeply engaged with the top 2a of the annular ridge 2 causing the latching pawls of the diametrically opposite lugs 4 to abut against the outside surface 2b of the annular ridge 2. If, under this condition, the wheel cover 3 is strongly pushed or struck, the lugs 4 and the stoppers 5 may be damaged or broken. In fact, because the wheel cover 3 assuming this inproper temporary position is viewed very similar to that assuming the above-mentioned proper temporary position, the undesired pushing and striking against the wheel cover 3 has been carried out very often.

SUMMARY OF THE INVENTION

It is therefore an object of the present invention to provide a wheel cover which is free of the above-mentioned drawback.

According to the present invention, there is provided a wheel cover which takes a "marked" or "easily recognized" posture relative to the wheel disc when the wheel cover assumes the inproper temporary position.

According to the present invention, there is provided a wheel cover for a road wheel. The wheel cover comprises a cover proper; a series of lugs integrally formed on an inboard face of the cover proper, each lug having a latching pawl which is to be latchingly engageable with an annular ridge formed on a wheel disc of a road wheel; a resilient wire ring held by the lugs and biasing the same radially outwardly; and a series of stoppers integrally formed on the inboard face of the cover proper, the stoppers being arranged to alternate with the lugs, wherein each of the stoppers comprises at least one radially extending wall which has an upper surface sloped, the height of the wall being gradually reduced as the distance from an inboad end of the same increases.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
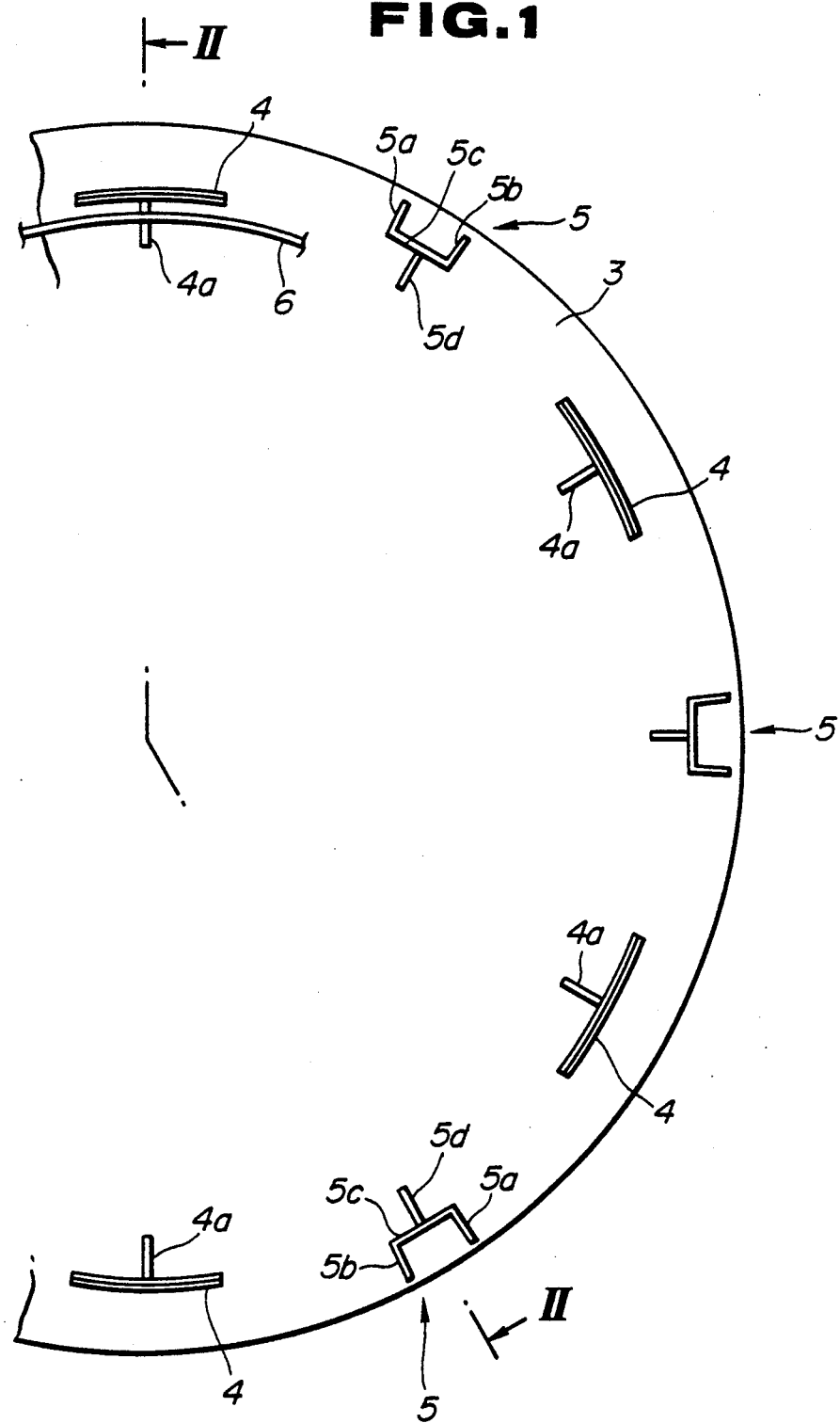
FIG. 1 is a back, but partial, view of a wheel cover of a first embodiment of the present invention.
Figure 2:
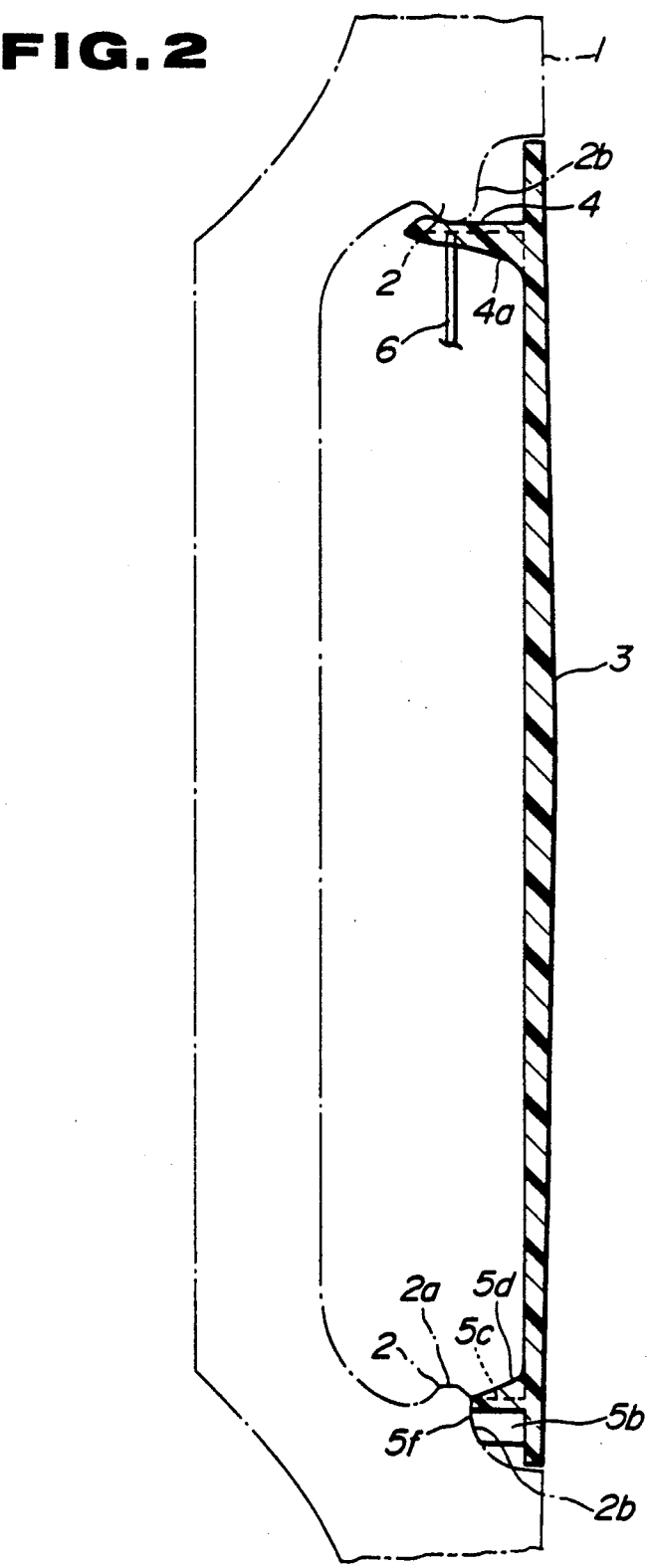
FIG. 2 is a sectional view taken along the line II—II of FIG. 1, showing a condition wherein the wheel cover is proper retained on a wheel disc.
Figure 3:
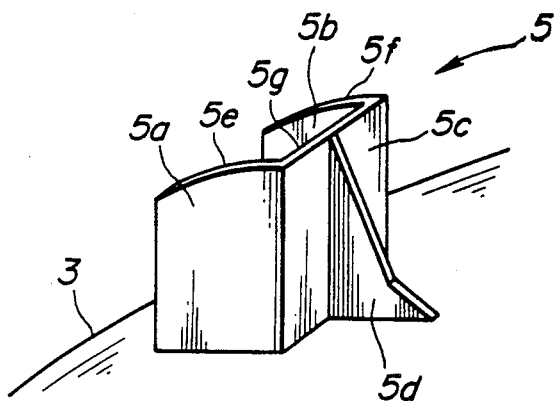
FIG. 3 is a perpective view of one of stoppers employed in the first embodiment.

Referring to FIGS. 1 to 3, there is shown a first embodiment of the present invention, which is a wheel cover designated by numeral 3.

As will be seen from FIG. 2, the wheel cover 3 is constructed of a plastic. The thickness of the cover 3 is gradually reduced with increase of distance from the center of the same.

As is seen from 1, the wheel cover 3 has a series of lugs 4 molded integrally therewith on the inboard face of the cover 3. The lugs 4 are spaced equally around the circumference of the cover 3 and have respective latching pawls (no numerals) at the tops. As is understood from FIGS. 1 and 2, each lug 4 is shaped like a curved plate which extends along the circumference of the cover 3, and each lug 4 has at its middle part a reinforcing rib 4a integrated therewith, the rib 4a extending radially inward from the lug 4. The lugs 4 are biased radially outwardly by a resilient wire ring 6 which is held by the reinforcing ribs 4a.

The wheel cover 3 further has a series of stoppers 5 integrated therewith. The stoppers 5 are arranged to alternate with the lugs 4. As is seen from FIG. 1, the stoppers 5 are located in the vicinity of the periphery of the wheel cover 3, that is, at the peripheral area which is radially outside with respect to the wire ring 6 fitted to the wheel cover 3.

As is seen from FIG. 3, each stopper 5 comprises opposed side walls 5a and 5b extending in a radial direction of the wheel cover 3, a connecting rib 5c integrally connecting inboard ends of the respective side walls 5a and 5b and a reinforcing rib 5d interposed between the connecting rib 5c and the cover proper 3. As shown, each side wall 5a or 5b is formed with an arcuate upper surface 5e or 5f, and the height of each side wall 5a or 5b is gradually reduced as the distance from the inboard end of the wall 5a or 5b increases. As will be understood as the description proceeds, the arcuate upper surface 5e or 5f serves as a guide means for guiding the movement of the wheel cover 3 to the properly engaged position of the wheel disc, and the upper surface designated by numeral 5g of the connecting rib 5c serves as a stopper means which abuts against the outside surface 2b of the annular ridge 2 of the wheel disc 1.

In order to retain the wheel cover 3 to the wheel disc 1, the following steps are taken, which will be described with an aid of FIGS. 4 to 6.

Figure 4:
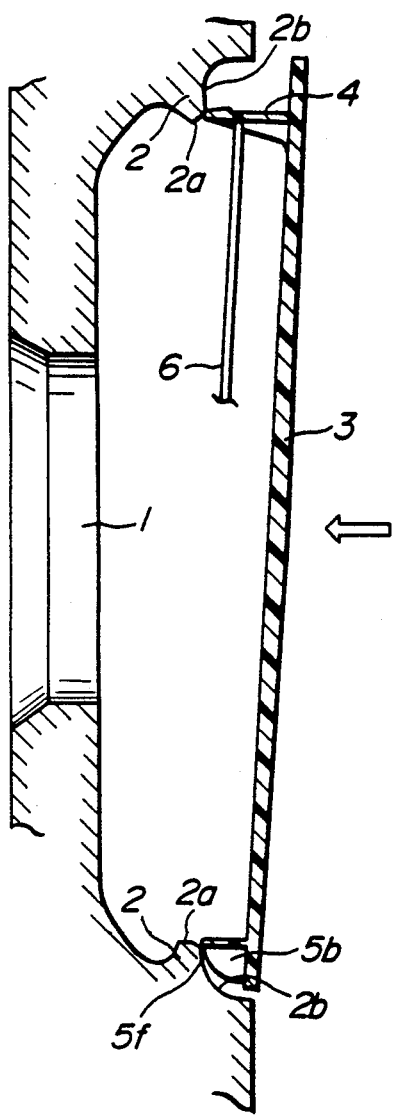
FIG. 4 is an illustration showing a condition wherein the wheel cover of the first embodiment assumes its proper temporary position.

Upon requirement of the wheel cover retaining, the same is brought to a proper temporary position as shown in FIG. 4 wherein the arcuate upper surfaces 5e and 5f of some of the stoppers 5 contact with the outside surface 2b of the annular ridge 2 of the wheel disc 1 and the latching pawls of the diametrically opposite lugs 4 contact with the top 2a of the annular ridge 2. Then, the wheel cover 3 is forced flatwise in a direction of the arrow against the outer face of the wheel disc 1. With this, the wheel cover 3 is properly retained by the disc wheel 1 in a manner as is shown in FIG. 2.

Figure 5:
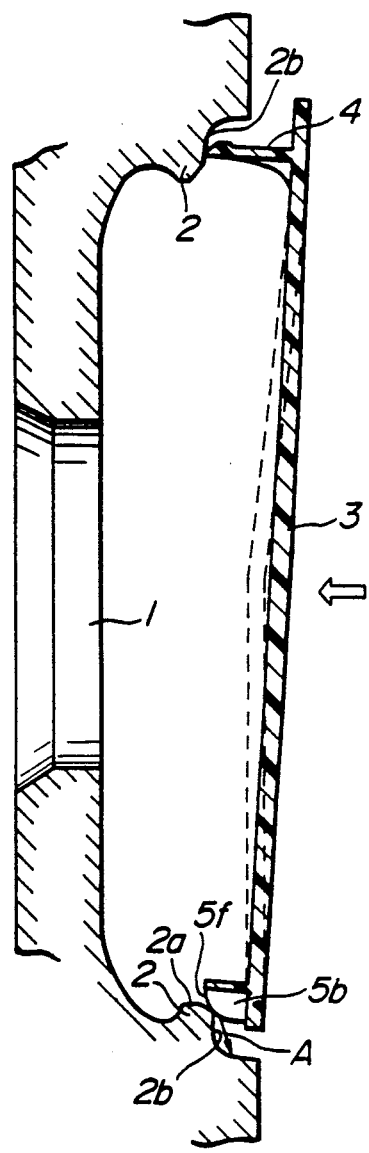
FIG. 5 is a view similar to FIG. 4, but showing a condition wherein the wheel cover assumes its inproper temporary position.

Even when, as is shown in FIG. 5, the wheel cover 3 assumes an inproper temporary position, that is, when the arcuate upper surfaces 5e and 5f of the stoppers 5 contact a shoulder part defined between the outside surface 2b and the top 2a of the annular ridge 2 causing the latching pawls of the diametrically opposite lugs 4 to abut against the outside surface 2b of the annular ridge 2, the subsequent pushing against the wheel cover 3 in the direction of the arrow can bring about the proper retaining of the wheel cover 3 to the wheel disc 1. That is, due to provision of the arcuate upper surfaces 5e and 5f of the stoppers 5, such pushing forces the stoppers 5 to slide radially outward (viz., in the direction of the arrow A) pulling the latching pawls of the lugs 4 to the top 2a of the ridge 2, and thus, a subsequent pushing of the wheel cover 3 completes the retaining of the wheel cover 3 relative to the wheel disc 1.

Figure 6:
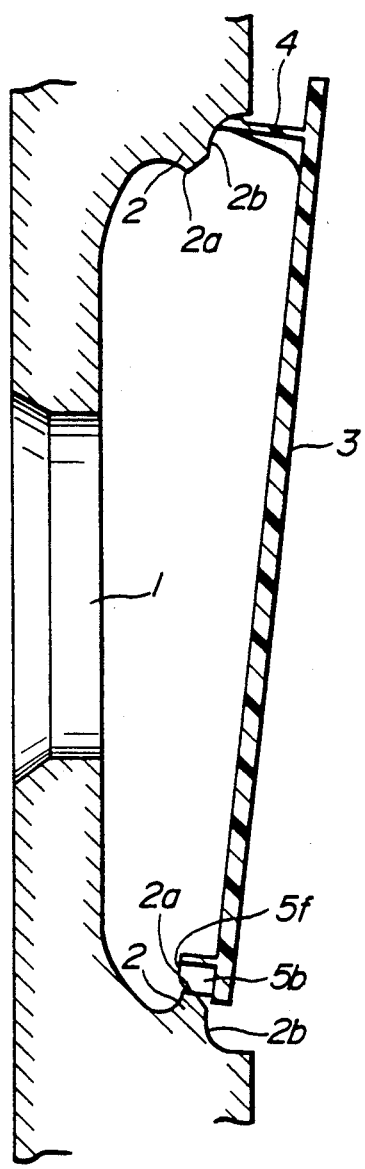
FIG. 6 is a view also similar to FIG. 4, but showing a condition wherein the wheel cover assumes a wrong position.
Figure 9:
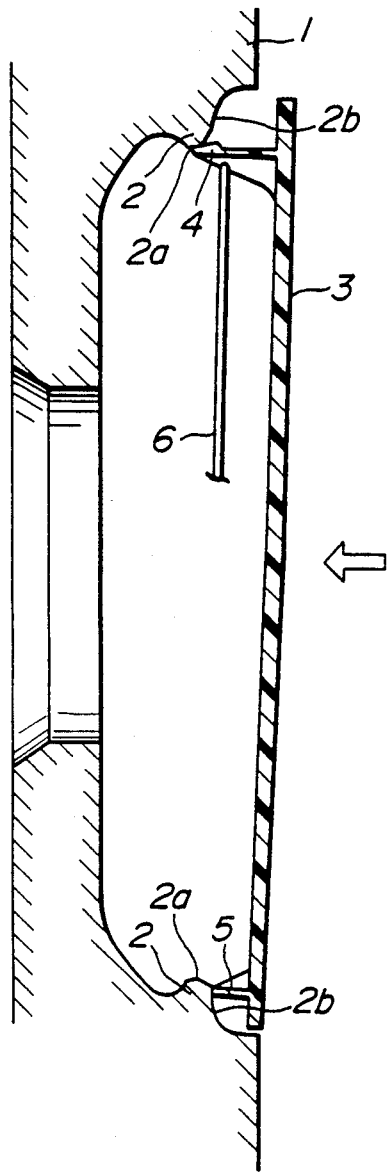
FIG. 9 is an illustration showing a condition wherein a conventional, prior art, wheel cover is in its proper temporary position.
Figure 10:
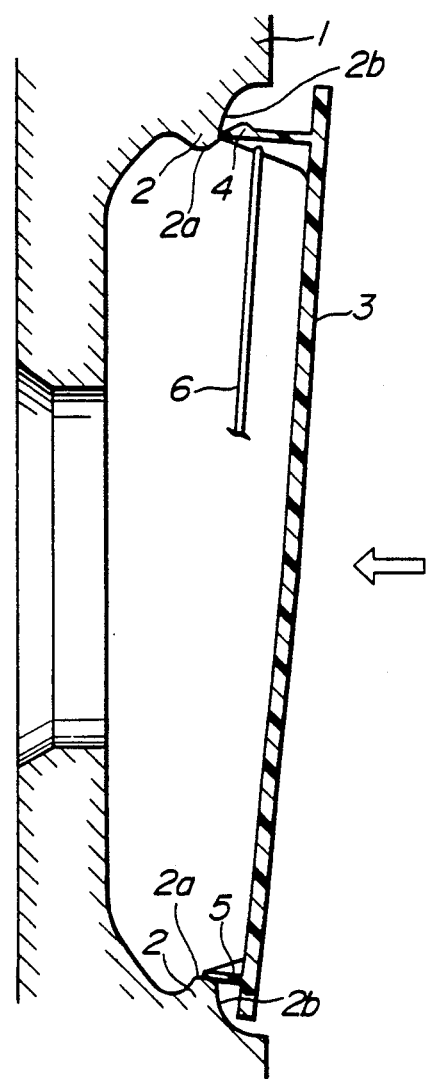
FIG. 10 is a view similar to FIG. 9, but showing a condition wherein the conventional wheel cover is in its inpropor temporary position.

If the wheel cover 3 assumes a wrong position as shown in FIG. 6 wherein the entire of the stoppers 5 rides over the top 2a of the annular ridge 2 of the wheel disc 1 largely displacing the latching pawls of the lugs 4 away from the annular ridge 2, the eccentricity of the wheel cover 3 is easily recognized by an operator who is handling the wheel cover 3. Upon this, the operator will try the wheel cover retaining again.

It is to be noted that the arcuate upper surface 5e or 5f of each side wall 5a or 5b is designed by considering both the curvature of the outside surface 2b of the annular ridge 2 of the wheel disc 1 and the moved distance required by the wheel cover 3 which assumes the inproper temporary position (see FIG. 5).

Figure 7:
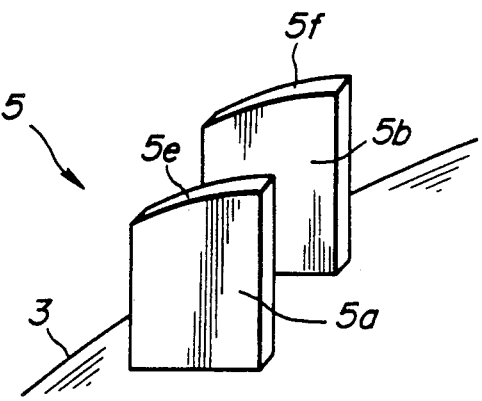
FIG. 7 is a perspective view of one of stoppers employed in a second embodiment of the present invention.

Referring to FIG. 7, there is shown a stopper 5 which is employed in a second embodiment of the present invention. As shown, the stopper 5 of this embodiment consists of only two side walls 5a and 5b, each extending in a radial direction of the wheel cover 3. Each side wall 5a or 5b is formed with an arcuate upper surface 5e or 5f, similar to the case of the above-mentioned first embodiment. Preferably, the thickness of each side wall 5a or 5b is greater than that of the first embodiment for assuring the mechanical strength of the same.

Figure 8:
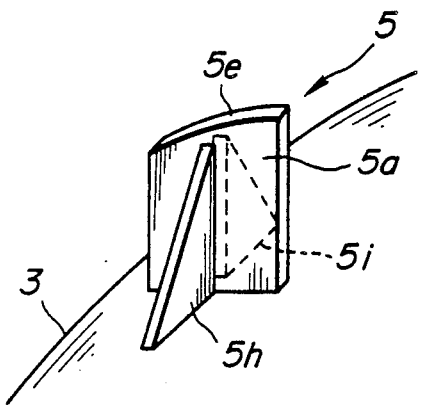
FIG. 8 is a perspective view of one of stoppers employed in a third embodiment of the present invention.

Referring to FIG. 8, there is shown a stopper 5 which is employed in a third embodiment of the invention. The stopper 5 of this embodiment comprises one wall 5a formed with an arcuate upper surface 5e, and two reinforcing ribs 5h and 5i integrated with the wall 5a.

If desired, the above-mentioned arcuate upper surface 5e or 5f may be replaced with an inclined flat surface.

Although the foregoing description is directed to a wheel cover 3 which is constructed of a plastic, the wheel cover may be of a sheet metal.

What is claimed is;

1. A wheel cover for use with a wheel disc, said wheel disc having an annular ridge integral therewith, said wheel cover comprising:
   a cover proper;
   a series of lugs integrally formed on a back face of said cover proper and equally spaced around the circumference of said cover proper, each lug having a latching pawl which latchingly engages with said annular ridge upon fitting of said wheel cover to said wheel disc;
   a resilient wire ring held by said lugs in a manner to bias the latching pawls radially outwardly;
   a series of stoppers integrally formed on said back face of said cover proper and arranged to alternate with said lugs, each stopper including at least one radially extending wall whose upper free edge is sloped so that said sloped free edge faces toward the perimeter of said wheel cover proper,
   wherein, upon proper fitting of said wheel cover to said wheel disc, said sloped free edge abuts against a given portion of said annular ridge of said wheel disc to stop further axial movement of said wheel cover toward said wheel disc, and wherein, upon improper fitting of said wheel cover to said wheel disc, said sloped free edge enables said stopper to slide into and abut said given portion, causing said wheel cover to properly fit against said wheel disc.

2. A wheel cover as claimed in claim 1, in which said stoppers are located at radially outside portions of the cover proper with respect to said wire ring held by said lugs.

3. A wheel cover as claimed in claim 2, in which said wall of each stopper is reinforced by a reinforcing rib which is integrally formed on said cover proper.

4. A wheel cover as claimed in claim 2, in which said upper edge of said wall constitutes an arcuate surface.

5. A wheel cover as claimed in claim 2, in which said upper edge of said wall constitutes an inclined flat surface.

6. A wheel cover as claimed in claim 2, in which said cover proper is constructed of a plastic.

7. A wheel cover as claimed in claim 6, in which each stopper comprises:
opposed side walls each extending radially outward with respect to said cover proper, each side wall having an arcuate upper surface, the height of each side wall being gradually reduced as the distance from an inboard end of the same increases;
a connecting rib integrally connecting inboard ends of the respective side walls; and
a reinforcing rib arranged between said connecting rib and said cover proper.

8. A wheel cover as claimed in claim 6, in which each stopper comprises:
two walls each extending radially outward with respect to said cover proper and having an arcuate upper surface, the height of each wall being gradually reduced as the distance from an inboard end of the same increases.

9. A wheel cover as claimed in claim 6, in which each stopper comprises:
a wall extending radially outward with respect to said cover proper and having an arcuate upper surface, the height of the wall being gradually reduced as the distance from an inboard end of the same increases; and
two reinforcing ribs each being interposed between said wall and said cover proper.

10. A wheel cover as claimed in claim 6, in which the thickness of said cover proper is gradually reduced as the distance from the center of said cover proper increases.

11. A wheel cover as claimed in claim 1, in which said lugs are spaced equally around the circumference of said cover proper.

* * * * *